(12) United States Patent
Nienhaus

(10) Patent No.: US 6,412,525 B1
(45) Date of Patent: Jul. 2, 2002

(54) DEVICE FOR FILLING OR DEFLATING A TIRE OF A VEHICLE, ESPECIALLY OF A TRACTOR

(75) Inventor: Clemens Nienhaus, Neunkirchen-Seelscheid (DE)

(73) Assignee: GKN WalterSchied GmbH (DE)

( * ) Notice: Subject to any disclaimer, the term of this patent is extended or adjusted under 35 U.S.C. 154(b) by 0 days.

(21) Appl. No.: 09/950,064

(22) Filed: Sep. 12, 2001

(30) Foreign Application Priority Data

Sep. 12, 2000 (DE) .......................................... 100 44 885

(51) Int. Cl.[7] ................................................. B65B 1/04
(52) U.S. Cl. ....................... 141/38; 301/5.24; 152/415; 152/418
(58) Field of Search .......................... 141/38; 301/5.24; 152/415–418

(56) References Cited

U.S. PATENT DOCUMENTS

| | | | |
|---|---|---|---|
| 4,685,501 A | * | 8/1987 | Williams .................. 137/487.5 |
| 4,862,938 A | * | 9/1989 | Mittal .......................... 141/38 |
| 4,938,272 A | * | 7/1990 | Sandy et al. ................. 137/225 |
| 5,313,996 A | * | 5/1994 | Bragg .......................... 141/38 |

* cited by examiner

*Primary Examiner*—Steven O. Douglas
(74) *Attorney, Agent, or Firm*—Harness, Dickey & Pierce, P.L.C.

(57) ABSTRACT

A device to fill or deflate a tire of a vehicle, such as a tractor, is arranged on the wheel rim of a wheel. The device includes a housing 14 with a second connecting port 11 to connect to a first connecting port 10. An inner member 21 is supported in the housing 14. The inner member 21 and housing 14 are both rotatable relative towards each other. The inner member 21 has a third connecting port 29 to connect to a connection 31, 32, which leads to the pressure supply. A control valve 9 is provided and coupled with the second connecting port. An annular chamber 25 is connected to the second connecting port 11 and the third connecting port 29. The annular chamber 25 is formed between the housing and the inner member 21. Two seals 26 are provided between the housing 14 and the inner member 21. The seal 26 laterally closes off the annular chamber 25. The seals are arranged on the inner member 21 and abut, due to the pressurization of the annular chamber, a respective one of the mating surfaces 27, 28 connected to the housing 14.

4 Claims, 4 Drawing Sheets

DEVICE FOR FILLING OR DEFLATING A TIRE OF A VEHICLE, ESPECIALLY OF A TRACTOR

CROSS-REFERENCE TO RELATED APPLICATIONS

This application claims priority to German Patent Application No. 100 44 885.2 filed Sept. 12, 2000, which application is herein expressly incorporated by reference.

FIELD AND BACKGROUND OF THE INVENTION

The present invention relates to a device that fills or deflates a tire. The tire is fillable with air. The tire is on a wheel of a vehicle, especially a tractor.

In tractors, a change of the air pressure in a tire is critical. During operation In the field, a lower tire pressure along with lower soil compaction provides higher traction. Low tire pressure during high speed operation of the tractor does not ensure driving stability, for example, 40 km/h. In the technical magazine profi-magazine for agrartechnik, 10/1995 "Der Luftdruck im Reifen: Keine Ursache, grosse Wirkung" ("The air pressure in the tire small causes, large effects") different control systems may be found. According to this article, the rotary transmitters are arranged on the inner side or the outer side of the wheel according to the axle type. In inexpensive systems, the air supply is achieved from the outside past the wheel to the rotary transmission leadthrough. In the arrangement with an intermediate flange between the wheel and the wheel flange, the attachment of the rotary transmission leadthrough is achieved via the wheel screws. This embodiment has its advantages. An advantage is that no pipes are exposed to the outside. However, the critical screw connection is stressed to a higher degree by the enlarged free bending length of the wheel screws.

U.S. Pat. No. 4,804,027 describes a device to fill and deflate a tire. The tire is fillable with air and is coupled with a wheel of a vehicle. The wheel is integrated into a wheel hub. The wheel hub supports the wheel flange. The wheel hub forms the external component and includes a channel. A connection is connectable to the channel, which leads to the tire. An inner member, which is kept stationary and is provided with a connection to a pressure supply, is supported on the hub. Two seals are fixed to the inner member and distanced from each other. The seals, together with a valve arrangement enclose an annular chamber. The valve is a spring loaded valve. The valve is opened when a predetermined pressure in the chamber is exceeded. The valve guides the air into the channel of the wheel hub. However, the valve is formed such that it only opens when the seals abut the corresponding radially outside bore face of the wheel hub. The seals are always pressed by the full pressure, which is present to fill the tire, against the corresponding mating faces of the wheel hub. This is disadvantageous at high relative speeds, since the high pressure leads to high friction. Accordingly, the high friction also leads to correspondingly high wear of the seals. A further disadvantage is that the hub and the inner member are supported independently from each other by further components. Accordingly, radial deviations affect the seals.

DE 0S 1 605 743 describes a device to control tire pressure in vehicles. Here, a rotary transmission leadthrough has an outer member and an inner member. The members are rotatable relative to each other and are sealed towards each other by contact seals. The members are constantly subjected to a relative movement.

A tire filling unit is described in DE 0S 1 907 082. This reference discloses that it is necessary for vehicles with relative high circumferential speeds to switch the rotary transmission leadthrough during normal operation. Accordingly, during non-operation of the tire filling unit, no pressure exists. However, it has been found that problems occur with respect to the sealing elements of the rotary connection. This problem is very obvious, when large diameters are present, as in the case of tractors.

SUMMARY OF THE INVENTION

Therefore, it is an object of the present invention to provide a device to fill or deflate a tire, which ensures secure sealing over a long lifetime.

This object is solved according to the invention by a device for filling or deflating tractor tires. The drive includes a first connecting port in the wheel rim of the wheel. A housing with a second connecting port, including a bore, connects to the first connecting port on the wheel.

An inner member is supported in the housing. The inner member and housing are both rotatable relative to each other. A third connecting port connects a pressure supply means. A controllable valve is connected to the second connecting port. An annular chamber is connected to the second connecting port and the third connecting port. The annular chamber is formed between the housing and the inner member.

Two seals laterally close the annular chamber. The seals are arranged between the housing and the inner member. The seals are fixed on one of the two components, namely the housing or the inner member. The seals contact, in a sealing way, the mating faces connected to the other component by pressurization of the annular chamber. The seals are formed rotationally symmetrically to a longitudinal axis. Each seal has an annular attachment portion with a first outer diameter. The first wall portion starts from the annular attachment portion. The first wall portion departs from the longitudinal axis to an apex. The apex has a second diameter and continues with a second wall portion. The second wall portion is axially distanced from the first wall portion and the attachment portion. The second wall portion extends towards the longitudinal axis and ends in an axially projecting sealing lip. The sealing lip is arranged on a third diameter. The third diameter is sized to abut the mating face. Thus, the following relationship exists: an annular face between the first diameter and the second diameter is larger than an annular face between the second diameter and the third diameter. Further, the seal is axially elastic.

In this embodiment, the seals only abut a mating face, when a pressure is present. Thus, for the other operational times, in which no filling is carried out, the friction between the seals and the corresponding mating faces is practically reduced to zero. Because wear is reduced, a high life time is achievable, even though large diameters are provided for the seals, as the arrangement is provided on the wheel.

Further, it Is advantageous that even with large diameters at any given time, only small sections are in contact which would produce wear. Thus, a device is achieved which has a long life time. Further, it is advantageous that the seals abut the mating surface with a force. This force results from the difference of the two annular faces multiplied with the pressure. Because of this the friction is essentially reduced. Thus, a tire can be filled during driving. The axial abutment of the seal on the mating faces enables the radial play between the housing and the inner member to have no effect on the function of the seals.

Preferably, the seals are connected to the inner member and the corresponding mating faces are arranged on the housing. One of the two mating faces may belong to a component. The component is sealingly connected to the housing: for example a lid.

Advantageously the arrangement is achieved such that the seal, with its sealing lip, contacts the mating surface free of pretensioning. Alternatively, the seal is arranged with a small gap relative to this mating surface in the unpressurized state. Furthermore, the annular chamber is connectable to the free atmosphere via a valve.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is represented schematically in the drawings.

DETAILED DESCRIPTION OF THE PREFERRED EMBODIMENTS

Figure 1:
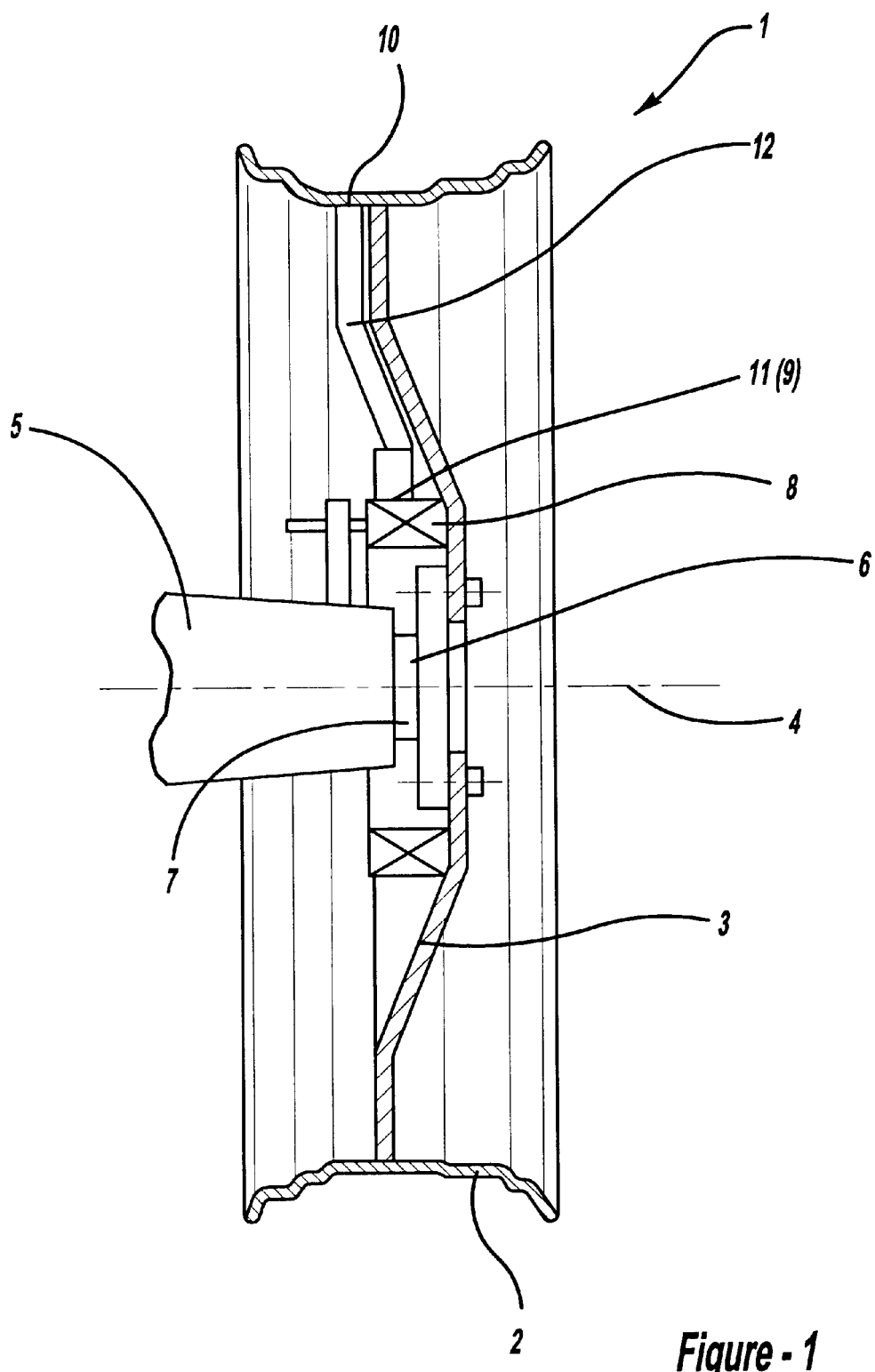
FIG. 1 is a cross-section view of a wheel in arrangement to the wheel flange of an axle shaft, the wheel projecting from the axle tube of a tractor.

FIG. 1 shows the wheel 1 without a tire. The wheel 1 includes a wheel rim 2 to receive a tire. A wheel center member 3 is attached, by screws, around the axis of rotation 4 to the wheel flange 6 of the axle shaft 7. The axle shaft 7 projects from the axis tube 5. The wheel 1 is driven rotationally via the axle shaft 7 and the wheel flange 6 around the axis of rotation 4. Of the tractor only the axle tube 5 is represented.

A rotary transmission leadthrough is fast with the wheel center member 3. The rotary transmission leadthrough is coaxially arranged around the wheel flange 6. The rotary transmission leadthrough represents a part of the device to fill or deflate the tire.

The device to fill or deflate the tire has a first connecting port 10 on the wheel rim 2; a second connecting port 11 on the housing of the device 8, to fill or deflate; a valve 9 connected to the second connect port; and a pipe 12 connecting the first connecting port 10 to the second connecting port 11. The valve 9 also replaces the common air valve arranged on the tire or the wheel rim, respectively. The air is transported to the device 8 by a central air pressure supply or compressor, via means not represented in more detail.

Figure 2:
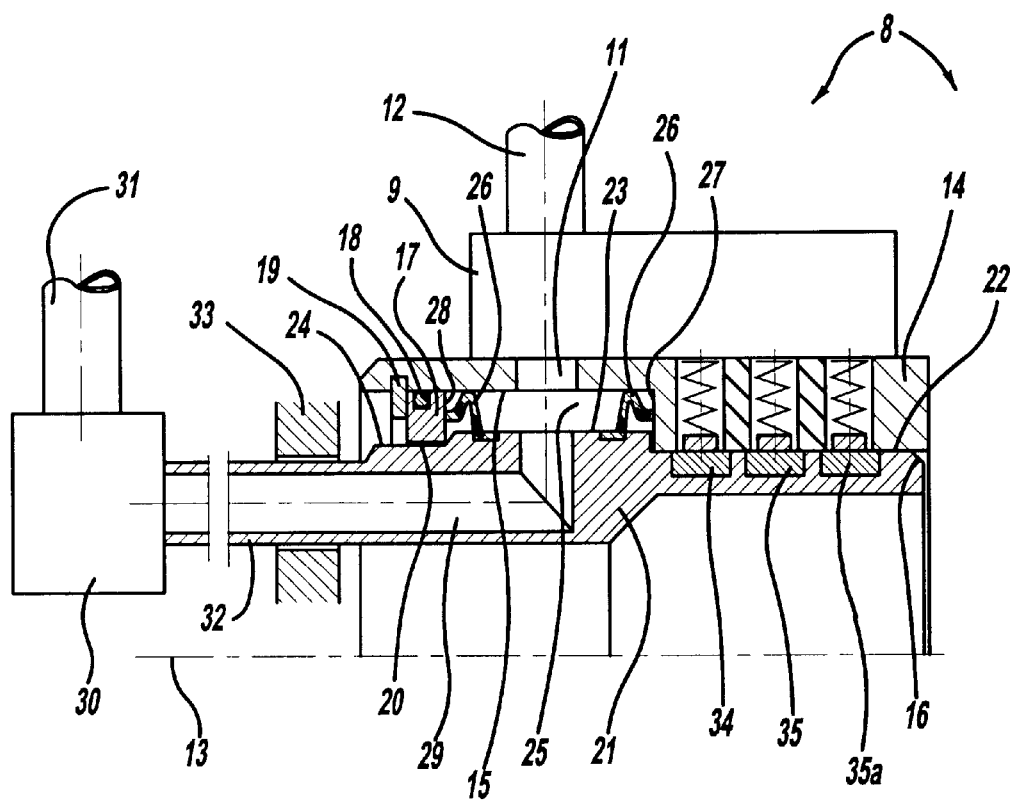
FIG. 2 is an enlarged longitudinal sectional view of a part of the device for filling or deflating a tire.
Figure 3:
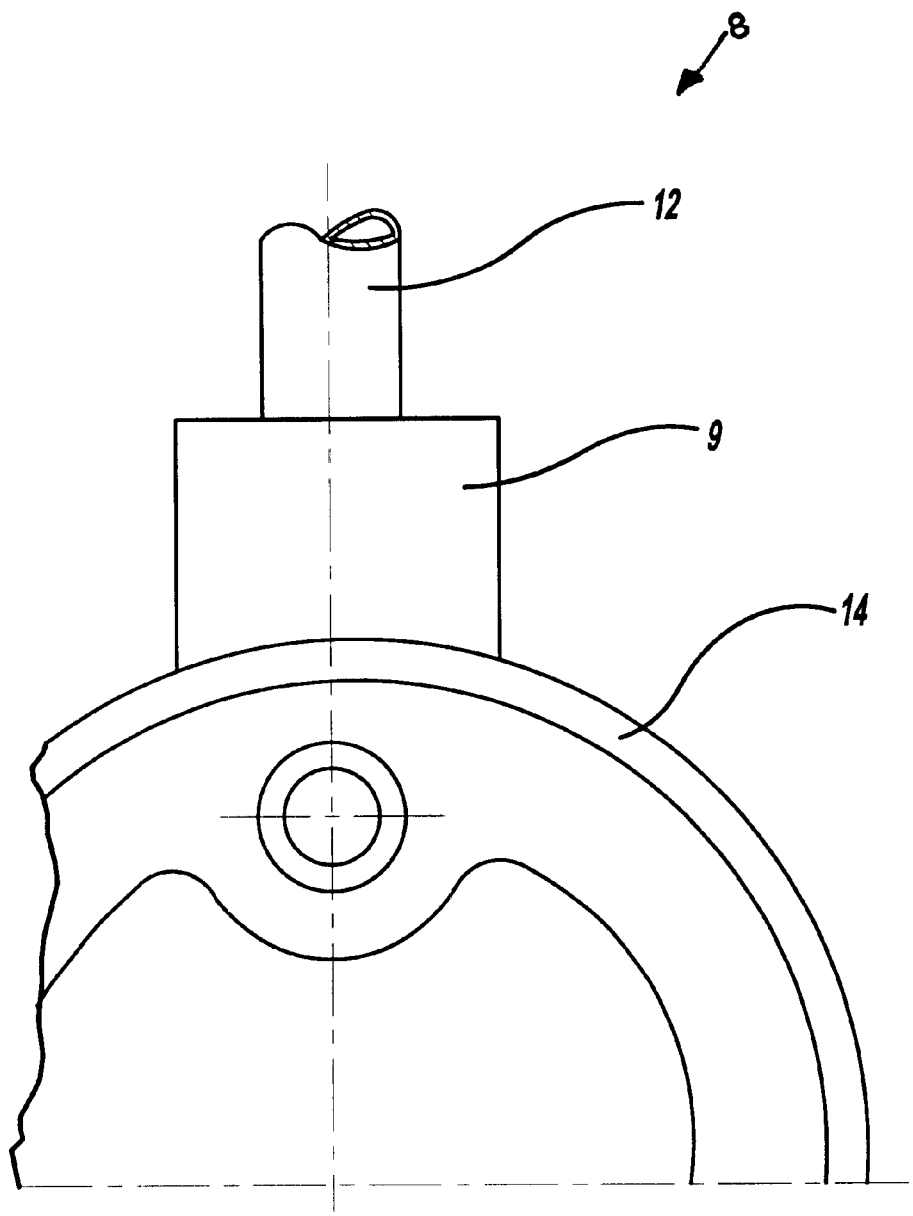
FIG. 3 is a side view of FIG. 2.

FIGS. 2 and 3 show the device 8 to fill or deflate a tire in more detail. The longitudinal axis of the device 8 to fill or deflate a tire is designated with the reference numeral 13. The device 8 is mounted on the wheel center member 3. Thus, the longitudinal. axis 13 coincides with the axis of rotation 4.

The device 8 Includes an annular housing 14 with a bore 15. A first bearing bore 16 is visible to the right hand side of the bore 15. The first bearing bore 16 is reduced in diameter. A lid 17 closes the bore 15 to the left hand side. The lid 17 is retained by a retaining ring 19. The lid 17 is sealed to the bore 15 by the seal 18. The lid 17 has a second bearing bore 20. The bearing bore 20 is also reduced in diameter in relation to the bearing bore 15.

An inner member 21 is rotationally supported in the housing 14. The inner member 21 has a first step face 22. The first step face 22 is rotationally received in the first bearing bore 16. A second step face 23, with a larger diameter than the first step face 22 and larger diameter than the third step face 14, is received in the bearing bore 20.

An annular chamber 25 is delimited by a first mating surface 27. A seal 26 and the first mating face 27 closes the bore 15 to the right hand side. The second mating surface 28, which belongs to the lid 17, abuts a further seal 26 to close the annular chamber to the left hand side. The second step face 23 closes an end of the annular chamber 25. The enlargement provided by the second step face 23 in relation to the first step face 22 and the third step face 24 provides an axial retainer of the inner member 21 in relation to the housing 14. The inner member 21 is further provided with a third connecting port 29. The third connecting port 29 achieves a pipe connection, via a push-in-coupling, with a main valve 30. The main valve 30 is provided with a connecting port 31 for the pressure generator (compressor).

The coupling (push-in-coupling) can be provided at the third connecting port 29 of the inner member 21. Alternatively, the coupling may be provided in the area of the main valve 30 or between the two. In cases where the coupling is arranged on the main valve 30, a connecting pipe 32 is provided. During assembly of the wheel, the connecting pipe 32 is engagable with a retainer 33. The retainer 33, for example, is attached to the axle tube. Thus, the inner member 21 is kept stationary when the wheel is attached, while the housing 14 rotates with the wheel center member. A second connecting port 11 in the housing 14 connects the valve 9 to the annular chamber 25. The pipe 12 leading to the first connecting port 10 in the area of the wheel rim, as seen in FIG. 1, connects to the valve 9.

Electric slip ring transmitters 34, 35, 35a are provided between the housing 14 and inner member 21. The electric slipping transmitters 34, 35, 35a connect electric control lines or an electric power supply line and ground line to the valve 9, an external operating unit, or the main valve 30, respectively. The third slip ring transmitter 35a can be omitted if a connection to the mass is ensured via the flange connection to the axle tube.

To achieve a pressure increase during rotation of the wheel 1, the main valve 30 is connected to a current. The compressed air arriving through the connection 31 and the main valve 30 is directed via the connecting pipe 32, into the third connecting port, 29 and, in turn, into the annular chamber 25. Since the annular chamber 25 is connected, via the second connecting port 11, to the valve 9, the air is directed: through the valve 9. The valve 9 opens when a predetermined pressure is exceeded. The air, via the pipe 12, is directed into the first connecting port 10 and into the tire. The valve 9 is a check or non-return valve, If the desired pressure is achieved, the main valve 30 is closed. At the same time, the valve 30 vents to atmosphere, so that the annular chamber 25 is unpressurized.

If the pressure in the tire is too high and should be reduced, the valve 9 is connected to a current, so that it is opened. The air can either pass from the valve 9 directly, via a channel to the outside, or via the annular chamber 25, to the main valve 30 and, in turn, via an air port, to the outside. If the desired pressure is achieved, the valve 9 is switched currentless and is closed. The predetermined pressure is kept in the tire. The main valve 30 as well as the valve 9 are in the normal condition (state) currentless. Therefore, in case of a power failure, a loss of pressure loss in the tire is prohibited. Likewise, a filling procedure can be started. Accordingly, no excess pressure can be generated. Preferably, electromagnetic actuated valves are used as valves 9, 30. This enables simple programming.

The device can also be designed such that an automatic filling and deflating procedure can be selected. A high comfort with a high security against faulty operation is, therefore, achieved. For example the pressure ratios for working in the field as well as for driving on the road can be stored in a control unit for different devices. The device can be simply activated and the pressure, specified for the device for driving on the road or in the field, is then generated. In case a permanent pressure monitoring is desired, an electrical manometer is arranged on the valve 9. For this an additional slip ring transmitter is necessary. In the permanent monitoring a regulation depending on the load can also be used.

Figure 4:
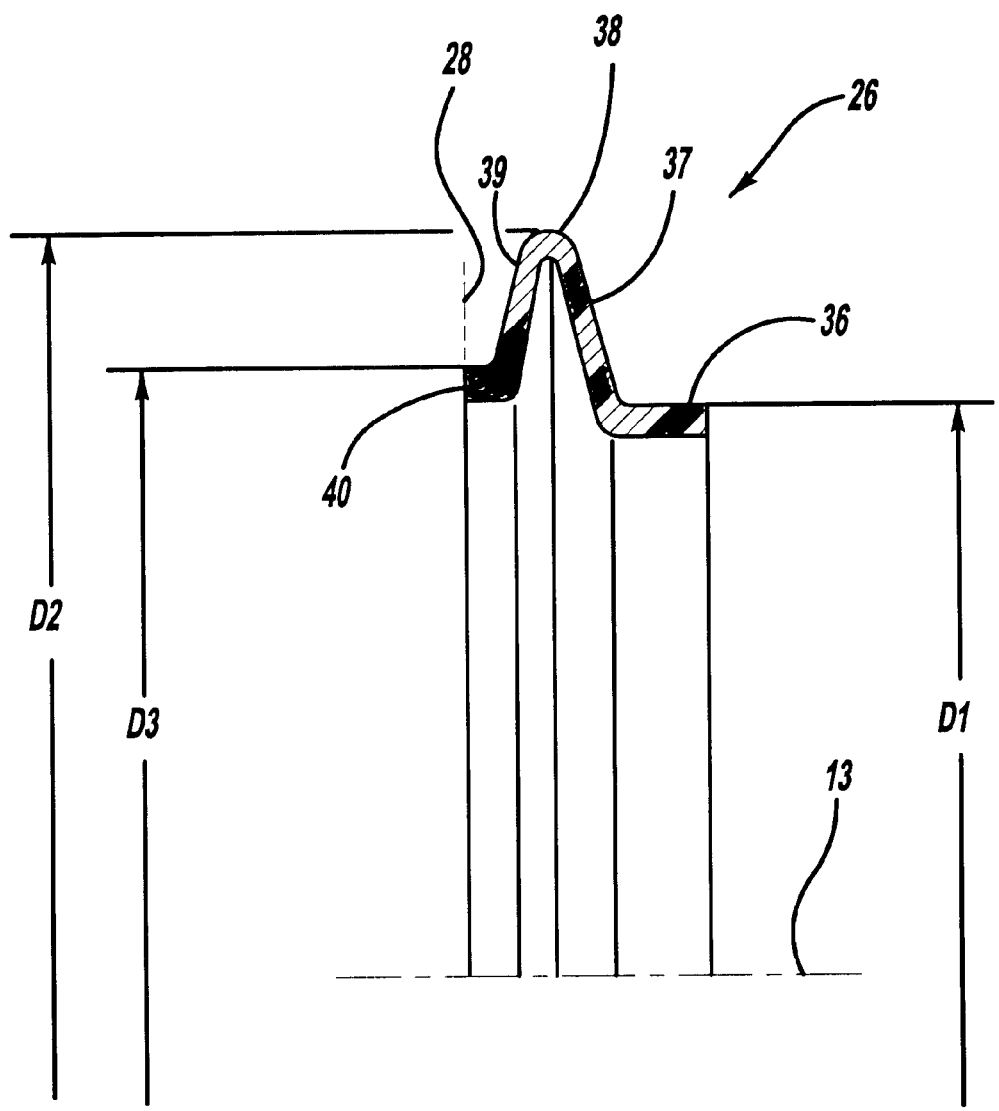
FIG. 4 is a cross-sectional detail view of the seal and the faces of the seal, effectively acted on by the pressure.

FIG. 4 illustrates a longitudinal sectional view of a seal 26. The seal 26 acts together with the second mating surface 28 of the lid 17. The following description of the features of the seal 26 is also valid for the other seal 26, which is arranged to the first mating surface 27 of the housing 14.

The seal 26 includes an attachment portion 36. The attachment portion 36 is annular and is visible from FIG. 2. The annular portion 36 is sunk into the inner member 21. The annular portion 36 is in the second step face 23 such that its outer face abuts the second step face 23. The diameter of the seal 26 in the area of this face is designated with D1.

A first wall portion 37 extends away from the longitudinal axis 13 from the attachment portion 36 to the outside. The wall portion 37 is essentially radially or inclined by a small amount with an arc, which extends over the apex 38. The arc continues into the second wall portion 39. The largest diameter in the area of the apex 38 is designated with D2.

The second wall portion 39 extends axially in the direction towards the longitudinal axis 13 and is distanced from the first wall portion 37. The second wall portion 39 ends in a sealing lip 40. The diameter of the sealing lip 40 is designated by D3. In the unpressurized state of the device, a small gap is formed between the sealing lip 40 and the second mating surface 28. However, the sealing lip can also abut the second mating surface 28 without pretensioning. The seal 26 is axially flexible. The annular face between the first diameter D1 and the second diameter D2 is larger than the annular face between the second diameter D2 and the third diameter D3. Thus, when the annular chamber 25 is pressurized, and a force created in the seal 26, the seal 26 axially deforms. The pressure forces the seal lip 40 to abut the second mating surface 28. The force is pressure dependent, However, the force does not correspond to the full filling pressure, because of the arrangement of the sealing lip 40 on a smaller diameter.

In FIG. 4. the seal is represented in an unpressurized state. Accordingly, a small gap is formed between the seal lip 40 and the second mating surface 28. However, it is also possible that the seal lip 40 abuts, without pretensioning, the second mating surface 28 when the sealing lip 40 is not pressurized. When the seal 26 is pressurized, the lip 40 has complete contact with the second mating surface 28. Thus, when the tractor is moving, where the wheel are rotating, when filling the tire or deflating the tire, the friction state between the sealing lip 40 and the second mating surface 28 is kept only as long as pressurization exists in the seal. After this sealing lip 40 lifts from the mating surface 28 or is brought into a state where it only contacts the face without pretensioning, essentially no wear occurs.

Both valves 9, 30 are formed as electromagnetic valves. The main valve 30 has two positions. In the first position (OFF) the main valve is switched currentless. The connection to the pressure generator or compressor is closed. The connection to the atmosphere is opened. The annular chamber 25 is unpressurized. In the second position (ON) the valve is switched on. The connection to the free atmosphere is closed and the air inlet, the connection to the pressure generator or compressor, is opened. Thus, the annular chamber 25 is acted upon by pressurized air. The seals 26. which are contact-free in the unpressurized state, are activated and air passes the valve 9 when exceeding the pressure. If the desired pressure is achieved, the main valve 30 closes and the connection to the atmosphere is opened. The annular chamber is unpressurized because of this and the valve 9 is automatically brought into the closed position.

For the deflating process, the valve 9 is acted upon by a current. Accordingly, a bypass is opened. The air is passed through the annular chamber 25 to the main valve 30 and escapes through the connection, in the main valve, to the free atmosphere. If the desired pressure is achieved the valve 9 is switched currentless and is closed. The predetermined pressure is kept by this valve. In this system it is advantageous that an independency of the design of the tractors or the vehicle is achieved as far as possible, as an arrangement to the wheel is provided. The critical screw connection between the wheel and the flange of the axle shaft is not influenced. Only a loose connection to the axle housing or the chassis is provided. This connection gives a large design freedom and enables a modular design with many identical parts. Furthermore, the design is suitable for the front and the rear wheel of a tractor as well as for attached trailers. There are no loose connections or hoses or valves In the critical area of the wheel center member. However it is especially important, that the seals are only activated during the filling process.

While the above detailed description describes the preferred embodiment of the present invention, the invention is susceptible to modification, variation and alteration without deviating from the scope and fair meaning of the subjoined claims.

What is claimed is:

1. A device for filling or deflating a tire, fillable with air and secured to a wheel of a vehicle, such as a tractor, a first connecting port in the wheel rim of the wheel, said device comprising:
    a housing having a second connecting port with a bore connecting to the first connecting port on the wheel;
    an inner member supported in the housing such that both the inner member and housing are rotatable relative to each other;
    a third connecting port connecting to a connection leading to a pressure supply means;
    a controllable valve connected to the second connecting port;
    an annular chamber connected to the second connecting port and the third connecting port, said annular chamber formed between the housing and the inner member; and
    two seals laterally closing off the annular chamber, said seals arranged between the housing and the inner member, said seals fixed on one of the housing or the inner member and contacting in a sealed way and mating faces connected to the other by pressurization of the annular chamber, said seals being formed rotationally symmetrically to a longitudinal axis and each seal having an annular attachment portion with a first outer diameter, a first wall portion starting from said attachment portion, said first wall portion departs from the longitudinal axis to an apex, said apex having a second diameter, said apex being continuous with a second wall portion, said second wall portion being axially distanced from the first wall portion and the attachment portion and extending towards the longitudinal axis, said second wall portion ending in an axially projecting sealing lip, said sealing lip being arranged on a third diameter, said sealing lip abutting the mating face, wherein a relationship applies, such that an annular face between the first diameter and the second diameter is larger than an annular face between the second diameter and the third diameter, and said seals being axially elastic.

2. The device according to claim 1, wherein the seals are connected to the inner member and the corresponding mating faces are arranged on the housing or belong to a component which is sealingly connected to the housing.

3. The device according to claim 1, wherein the seals with their sealing lip contact free of pretensioning the mating face or is arranged with a small gap relative to this mating face in the unpressurized state.

4. The device according to claim 1, wherein the annular chamber is connectable to the free atmosphere via a valve.

* * * * *